United States Patent Office 2,753,391
Patented July 3, 1956

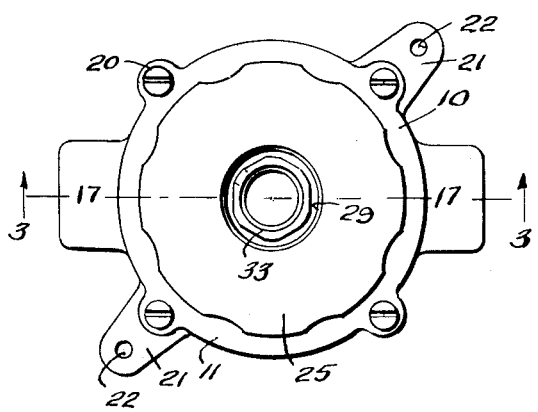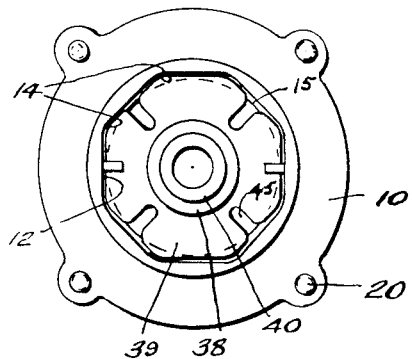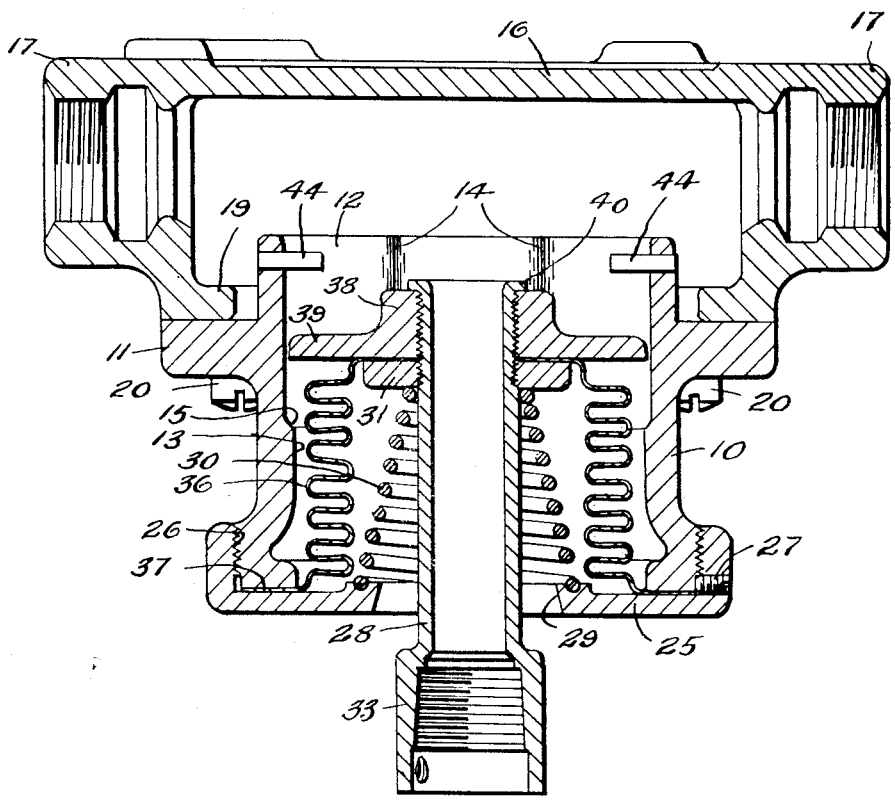

2,753,391

EXPLOSION PROOF FLEXIBLE FIXTURE HANGER

Russell P. Northup, Syracuse, N. Y., assignor to Crouse-Hinds Company, Syracuse, N. Y., a corporation of New York Application July 31, 1951, Serial No. 239,482

2 Claims. (Cl. 174—62)

This invention relates to explosion proof flexible hangers for electrical fixtures.

The invention has as an object a fixture hanger of the type referred to embodying a novel structure providing a complete and effective seal between the conduit line and the outer atmosphere, and yet providing a universal yielding movement of the fixture carrying stem and the fixture carried thereby.

The invention has as a further object an explosion proof flexible fixture hanger embodying the structure permitting the device to be disassembled for ease and convenience in wiring, without adversely affecting the explosion proof seal.

The invention consists in the novel features and in the combinations and constructions hereinafter set forth and claimed.

In describing this invention, reference is had to the accompanying drawings in which like characters designate corresponding parts in all the views.

Figure 1 is a bottom plan view of a fixture hanger embodying my invention.

Figure 2 is a top plan view of the body of the device with the top closure or housing removed.

Figure 3 is a sectional view taken on line 3—3, Figure 1.

The fixture hanger comprises a body member formed with a passage therethrough, with the body normally positioned with the passage extending vertically. The upper end of the body is provided with a flame tight closure which, preferably, is in the form of a housing adapted to be connected in the conduit line, and the lower end of the body is provided with an annular inwardly extending flange. The fixture stem extends upwardly through the flange into the passage in the body and is yieldingly supported by a spring means. The stem is encircled by a metallic cylindrical bellows member sealed at its upper end to the upper end portion of the stem, and at its lower end to the flange, and means is provided for limiting vertical movement of the stem and rotation thereof relative to the body.

In the drawing, the body 10 is of general cylindrical formation having an outwardly extending radial flange 11 in proximity to its upper end. The body is formed with an axially extending passage, the upper portion 12 of which is shown as of non-circular formation, while the lower portion of the passage is of cylindrical formation.

As shown in Figure 2 of the drawings, the upper portion 12 of the passage is of octagonal shape defined by corners 14 at the joinder of the sides. The cylindrical portion 13 is slightly less in diameter than the distance across the flat sides of the upper portion 12, thereby forming a shoulder or ledge 15 on the interior of the body.

The body 10 is provided with a flame tight closure preferably in the form of a junction box or housing 16 provided with hub portions 17 threaded internally for connection in a conduit line. The housing 16 is formed with an opening in one side encircled by a flange 19 for the reception of the flange 11 on the body and which is detachably secured to the flange 19, as by screws 20. The confronting surfaces of the flanges 11, 19, are ground or otherwise machined to form a flame tight joint. The housing 16 may also be provided with suitable lugs or projections 21 apertured at 22 to receive fastening screws for affixing the housing to a ceiling, or other support.

The body 10 is provided with an inwardly extending annular flange member 25, as shown in Figure 3. This member is preferably detachably secured to the lower end of the body by being threaded thereon, as indicated at 26, and being fixedly locked by a set screw 27. The fixture carrying stem 28 extends upwardly through the aperture 29 in the flange 25 into the interior of the body and is yieldingly supported by spring means which, preferably, is in the nature of a conical shaped coil compression spring 30 encircling the stem 28 and resting at its lower end on the flange 25 and abutting at its upper end against a collar 31 fixedly secured to the upper end of the stem as by being threaded thereon, as shown in Figure 3. The flange 25 is formed with a circular groove extending about the aperture 29 and which receives the lowermost coil of the spring 30 and functions to maintain the spring in concentric relation to the aperture. The spring 30 serves to yieldingly support the stem 28 against downward axial movement, and also permits the stem to have yielding movement in a lateral direction, the extent of which is limited by the diameter of the aperture 29 in the flange 25, as will be apparent. The lower end of the stem is provided with means, as the internally threaded hub 33, for attaching the lighting fixture, or other device, the lead wires from which extend upwardly through the tubular stem 28 for attachment to the conductors of the conduit line in the housing 16.

The interior of the upper end of the body and of the housing is sealed off from the atmosphere by a cylindrical metallic bellows 36, the lower end of which rests upon the flange 25 and is effectively sealed thereto by extending between the flange and the lower edge of the body, as indicated at 37. The upper end of the bellows overlies the collar 31 and is sealed thereto by being clamped between the collar and the hub portion 38 of a disk 39. The disk 39 may also be threaded on the upper end of the stem 28, and the upper end of the stem spun over, as at 40, to fixedly lock the disk to the stem. The disk 39 is of non-circular shape at its periphery complemental to the upper portion 12 of the body passage and accordingly, prevents relative rotation between the stem and the body. Downward movement of the stem is limited upon engagement of the disk 39 with the shoulder 15. Upward movement of the stem is limited upon engagement of the disk 39 with pins 44 extending inwardly from the upper side wall of the body 10.

The disk 39 is formed with slots 45 extending inwardly from the periphery of the disk. The function of these slots is to permit pressure formed within the housing 16 to be equalized on both sides of the disk. For example, if there is an explosion in the conduit run, resulting in a high pressure being built up in the housing 16, the gas can readily pass through the slots 45 to equalize the pressure on both sides of the disk and to prevent it from being forcibly moved downward into engagement with the shoulder 15.

With this structure, the stem 28 is yieldingly supported for universal movement, the spring 30 being capable of effectively supporting the stem for heavy fixtures. For ordinary lighting fixtures, the spring 30 may be dispensed with and the stem supported by the bellows 36.

What I claim is:

1. An explosion proof flexible fixture hanger comprising a housing, a body member detachably secured to the housing in flame tight relation thereto and being formed with a vertically extending passage, the upper portion of said passage being of non-circular form and having an inwardly extending shoulder at the bottom of said non-circular portion, a fixture carrying stem extending upwardly in said passage and being provided at its upper end with a disk formed at its periphery complemental to said non-circular portion of said passage, said disk being formed with a plurality of slots extending radially inward from its periphery, a cylindrical flexible bellows member encircling said stem and being secured thereto in flame tight relation at its upper end and being secured in flame tight relation at its lower end to said body, and spring means mounted within the body and encircling said stem and being operable to yieldingly urge said disk upwardly from said shoulder.

2. An explosion proof flexible fixture hanger comprising a housing formed with an opening in one side, a body member detachably secured to the open side of the housing in flame tight relation thereto and depending therefrom, said body being formed with a vertically extending passage, an annular member detachably secured to the lower end of the body and forming an inwardly extending flange at the lower end of said passage, a fixture stem extending upwardly through said annular member, a member having at least one opening extending therethrough and a central hub portion secured to the upper end of said stem in flame tight relation thereto and extending laterally from the stem in the upper portion of said passage, a spring positioned on said flange within said passage and coacting at its upper end with said laterally extending member to yieldingly support said stem, a cylindrical bellows member encircling said spring and having its upper end secured to the hub portion of said laterally extending member in flame tight relation thereto and having its lower end portion clamped between said annular member and the body in flame tight relation thereto, said laterally extending member being formed to provide a passage between the interior of said housing and the space between said bellows and the side wall of said vertical passage.

References Cited in the file of this patent

UNITED STATES PATENTS

| | | |
|---|---|---|
| 1,555,821 | Benjamin | Oct. 6, 1925 |
| 2,230,277 | Volker et al. | Feb. 4, 1941 |

FOREIGN PATENTS

| | | |
|---|---|---|
| 634,693 | Germany | Sept. 3, 1936 |
| 575,810 | Great Britain | Mar. 6, 1946 |